United States Patent
Imai et al.

(10) Patent No.: US 12,404,121 B2
(45) Date of Patent: Sep. 2, 2025

(54) OVERHEAD CONVEYOR, AND WORKPIECE CONVEYING METHOD USING OVERHEAD CONVEYOR

(71) Applicant: NAKANISHI METAL WORKS CO., LTD., Osaka (JP)

(72) Inventors: Atsushi Imai, Osaka (JP); Kazuhisa Yoshikawa, Osaka (JP)

(73) Assignee: NAKANISHI METAL WORKS CO., LTD., Osaka (JP)

( * ) Notice: Subject to any disclaimer, the term of this patent is extended or adjusted under 35 U.S.C. 154(b) by 459 days.

(21) Appl. No.: 17/966,531

(22) Filed: Oct. 14, 2022

(65) Prior Publication Data

US 2023/0137426 A1 May 4, 2023

(30) Foreign Application Priority Data

Oct. 29, 2021 (JP) ................................ 2021-177610

(51) Int. Cl.
*B65G 47/90* (2006.01)
*B65G 9/00* (2006.01)

(52) U.S. Cl.
CPC .......... *B65G 47/902* (2013.01); *B65G 9/006* (2013.01)

(58) Field of Classification Search
None
See application file for complete search history.

(56) References Cited

U.S. PATENT DOCUMENTS

| | | | | |
|---|---|---|---|---|
| 1,725,264 A | * | 8/1929 | Garnett | B61B 3/02 |
| | | | | 105/155 |
| 4,724,944 A | * | 2/1988 | Koshigai | B62D 65/18 |
| | | | | 105/156 |
| 6,994,510 B2 | * | 2/2006 | Cooke | B66C 17/00 |
| | | | | 414/626 |

FOREIGN PATENT DOCUMENTS

JP H04-005581 B2 1/1992

* cited by examiner

*Primary Examiner* — William R Harp
(74) *Attorney, Agent, or Firm* — Kratz, Quintos & Hanson, LLP

(57) ABSTRACT

Provided is an overhead conveyor that conveys a carrier loaded with a workpiece. The carrier includes a primary carrier, and a secondary carrier having a hanger that supports the workpiece. The overhead conveyor includes a rotation drive device that rotates the secondary carrier around the vertical axis, a friction brake device that makes the secondary carrier non-rotatable with respect to the primary carrier, and a rotation positioning device that is disposed on a ground side, and positions the secondary carrier at a predetermined rotation end position. The friction brake device, in an operating state thereof, brings a friction member included in a main body provided in the primary carrier, into press-contact with a brake member provided in the secondary carrier.

8 Claims, 13 Drawing Sheets

OVERHEAD CONVEYOR, AND WORKPIECE CONVEYING METHOD USING OVERHEAD CONVEYOR

BACKGROUND OF THE INVENTION

Field of the Invention

The present invention relates to an overhead conveyor that conveys a carrier loaded with a workpiece in a suspended manner.

Description of the Background Art

As an overhead conveyor for conveying a carrier that is loaded with a workpiece and is suspended from a trolley engaged with a running rail laid along a conveyance path, there is an overhead conveyor disclosed in Japanese Examined Patent Publication No. H4-5581 (Patent Literature 1), for example. In this overhead conveyor, the carrier is composed of a primary carrier (e.g., a frame in Patent Literature 1) including the trolley, and a secondary carrier (e.g., a hanger in Patent Literature 1) supporting the workpiece, and the secondary carrier is rotatable around a vertical axis (e.g., a vertical shaft in Patent Literature 1) with respect to the primary carrier.

The overhead conveyor of Patent Literature 1 is used in an automobile manufacturing line, and the hanger supports an automobile body as the workpiece. The overhead conveyor of Patent Literature 1 includes a locking device that makes the hanger non-rotatable with respect to the frame, and an unlocking device that unlocks the locking device to make the hanger rotatable with respect to the frame.

The locking device moves a lock pin downward to insert the lock pin in a vertical lock hole provided in the hanger. The unlocking device moves the lock pin upward to remove the lock pin from the lock hole. In the hanger, a plurality of lock holes are provided around the vertical shaft in accordance with a predetermined angle at which the hanger is rotated around the vertical shaft.

In the overhead conveyor of Patent Literature 1, when the direction of the automobile body needs to be changed at a predetermined position in the conveyance path, the hanger is rotated by a predetermined angle by a rotation drive device or by man power of an operator with the lock pin being removed from the lock hole by the unlocking device, and thereafter the lock pin is inserted in the lock hole by the locking device.

CITATION LIST

Patent Literature

[PTL 1] Japanese Examined Patent Publication No. H4-5581

SUMMARY OF THE INVENTION

When the locking device that makes the hanger non-rotatable with respect to the frame, as described in Patent Literature 1, is used, a clearance having a desired size needs to be ensured between the lock hole and the lock pin. The reason is as follows. If the clearance is small, twisting may occur when an operation of inserting/removing the lock pin in/from the lock hole is performed, and such twisting may make the operations of the locking device and the unlocking device impossible or unreliable.

Therefore, even if the hanger is made non-rotatable with respect to the frame by the locking device, horizontal rattling easily occurs around the vertical shaft due to the presence of the clearance having the desired size when an operation is performed on the automobile body. In particular, such rattling is increased near ends (front end and rear end) of the automobile body which is a long object having such ends protruding from the hanger, and therefore operability is deteriorated.

An object of the present invention is to prevent deterioration of operability of an operation performed to a workpiece in a conveyance path, in an overhead conveyor including a secondary carrier that supports the workpiece and is rotatable around a vertical axis with respect to a primary carrier.

In order to solve the above problem, an overhead conveyor according to the present invention is an overhead conveyor for conveying a carrier loaded with a workpiece, and the carrier is suspended by a trolley that is engaged with a running rail laid along a conveyance path. The carrier includes a primary carrier connected to the trolley, and a secondary carrier having a hanger that supports the workpiece. The secondary carrier is rotatable around a vertical axis with respect to the primary carrier. The overhead conveyor includes: a rotation drive device that rotates the secondary carrier around the vertical axis; a friction brake device that sets the secondary carrier in a non-rotatable state with respect to the primary carrier; and a rotation positioning device that is disposed on a ground side and positions the secondary carrier at a predetermined rotation end position obtained by rotating the secondary carrier by a predetermined rotation angle around the vertical axis. The friction brake device, in an operating state thereof, brings a friction member included in a main body provided in one of the primary carrier and the secondary carrier, into press-contact with a brake member provided in the other one of the primary carrier and the secondary carrier.

In this configuration, the friction brake device, in the operating state, brings the friction member into press-contact with the brake member, thereby making the secondary carrier non-rotatable with respect to the primary carrier. Therefore, the mechanism of making the secondary carrier non-rotatable with respect to the primary carrier is simplified.

At the predetermined rotation start position of the secondary carrier, in which the carrier has been stopped at a predetermined position in the conveyance path, the friction brake device is set in a non-operating state, and the secondary carrier is rotated by a predetermined angle around the vertical axis by the rotation drive device. Then, the secondary carrier is positioned at the predetermined rotation end position by the rotation positioning device, and thereafter, the friction brake device is set in the operating state. When the friction brake device is in the operating state, the friction member of the main body provided in one of the primary carrier and the secondary carrier is in press-contact with the brake member provided in the other one of the primary carrier and the secondary carrier, thereby preventing rattling. When an operation is performed on an end portion of the workpiece that is a long object whose both ends in the longitudinal direction protrude from the hanger of the secondary carrier, at a certain position in the conveyance path, for example, force that causes a moment around the vertical axis may act on the workpiece due to the operation. Even in such a situation, the operability of the operation performed on the workpiece that is a long object is not deteriorated because rattling is prevented by the friction brake device.

Here, preferably, the secondary carrier includes a drive body having, as a drive surface, a cylindrical outer peripheral surface, and the rotation drive device includes, on the ground side, a friction roller type drive device that includes a friction roller capable of moving toward and retracting from the drive surface of the secondary carrier, and a backup roller that holds, with the friction roller, the drive body of the secondary carrier.

In the above configuration, the secondary carrier is rotated around the vertical axis by the friction roller type drive device while the cylindrical outer peripheral surface of the drive body of the secondary carrier is held between the friction roller and the backup roller which are provided on the ground side. Therefore, the structure of the rotation drive device is simplified, thereby improving the maintainability. Moreover, the secondary carrier and the workpiece can be stably rotated around the vertical axis while maintaining their attitudes without being tilted.

Preferably, the rotation positioning device includes: a stopping member that stops a rotation positioning body provided in the secondary carrier; and a pressing member that presses the rotation positioning body toward the stopping member so as to hold, with the stopping member, the rotation positioning body.

In the above configuration, the stopping member stops the rotation positioning body provided in the secondary carrier, and the pressing member presses the rotation positioning body toward the stopping member so as to hold, with the stopping member, the rotation positioning body. Therefore, even if the moments of inertia, around the vertical axis, of the secondary carrier and the workpiece supported by the hanger of the secondary carrier, are great, the secondary carrier can be accurately positioned at a position obtained by rotating the secondary carrier by a predetermined rotation angle around the vertical axis with respect to the primary carrier. Since the friction brake device is set in the operating state with the secondary carrier being thus positioned, the state in which the secondary carrier is positioned with respect to the primary carrier is maintained.

Preferably, the overhead conveyor further includes, in addition to the friction brake device, a rotation stop device that sets the secondary carrier in a non-rotatable state with respect to the primary carrier, and the rotation stop device in an operating state causes a projection of a main body provided in one of the primary carrier and the secondary carrier, to move into a recess or a hole provided in the other one of the primary carrier and the secondary carrier.

In the above configuration, when the rotation stop device is in the operating state, the projection enters the recess or the hole. Accordingly, the secondary carrier can be stably and reliably set in the non-rotatable state with respect to the primary carrier by a simple mechanical structure. Therefore, even if the friction brake device becomes inoperable due to a failure or the like, the secondary carrier and the workpiece are prevented from unexpectedly rotating due to external force or inertial force.

Preferably, the friction brake device is disposed inward, in a radial direction, with respect to an inner ring of a swing bearing that supports the secondary carrier rotatably around the vertical axis with respect to the primary carrier.

In this configuration, the friction brake device is disposed inward in the radial direction with respect to the inner ring of the swing bearing, so that reduction in the diameter of the brake member can be achieved while utilizing the space that is radially inward with respect to the inner ring of the swing bearing. Therefore, reduction in weight and size of the whole friction brake device can be achieved in a space-saving manner.

Preferably, the friction brake device, in the operating state, brings the friction member included in the main body provided in the primary carrier, into press-contact with the brake member provided in the secondary carrier.

In this configuration, the main body of the friction brake device is provided not in the secondary carrier that rotates but in the primary carrier that does not rotate. Accordingly, routing of the pipe or the wiring for supplying the compressed air or the electric power to the main body is facilitated.

A workpiece conveying method according to the present invention uses the aforementioned overhead conveyor, and the friction brake device is in the operating state when no compressed air or electric power is supplied thereto. The method includes: at a predetermined rotation start position of the secondary carrier in the conveyance path, supplying compressed air or electric power to the friction brake device through a pipe or wiring connected by an automatic connection/disconnection device provided on the ground side, thereby setting the friction brake device in a non-operating state; rotating the secondary carrier by the rotation drive device; positioning the secondary carrier at the predetermined rotation end position by the rotation positioning device; disconnecting the pipe or the wiring by the automatic connection/disconnection device to stop supply of the compressed air or the electric power to the friction brake device, thereby setting the friction brake device in the operating state; and conveying the carrier and the workpiece to a downstream-side operation step by the overhead conveyor.

In the above configuration, the friction brake device is in the operating state when no compressed air or electric power is supplied thereto, thereby eliminating the necessity of supplying compressed air or electric power at positions, in the conveyance path, other than the predetermined rotation position of the secondary carrier. Moreover, at the predetermined rotation position, the pipe or the wiring can be connected and disconnected by the automatic connection/disconnection device provided on the ground side, thereby enabling the supply source of the compressed air or the electric power to the friction brake device to be provided on the ground side, whereby the structure of the carrier to be loaded with the workpiece can be simplified.

Conventionally, when electric power is supplied from the ground side to a device on the carrier side, a current collector on the carrier side is brought into sliding contact with a bus bar provided on the ground side. This configuration has a problem that dust is caused by the sliding contact between the bus bar and the current collector. Meanwhile, according to the configuration of the present invention in which compressed air or electric power is supplied to the friction brake device through the pipe or the wiring connected by the automatic connection/disconnection device provided on the ground side, the above problem can be solved because the sliding contact is avoided.

A workpiece conveying method according to the present invention uses the aforementioned overhead conveyor further including the rotation stop device, and the friction brake device and the rotation stop device are respectively in the operating states when no compressed air or electric power is supplied thereto. The method includes: at a predetermined rotation start position of the secondary carrier in the conveyance path, supplying compressed air or electric power to the friction brake device and the rotation stop device through a pipe or wiring connected by an automatic connection/disconnection device provided on the ground side, thereby setting the friction brake device and the rotation stop device respectively in non-operating states; rotating the secondary carrier by the rotation drive device; positioning the secondary carrier at the predetermined rotation end position by the rotation positioning device; disconnecting the pipe or the wiring by the automatic connection/disconnection device to stop supply of the compressed air or the electric power to the friction brake device and the rotation stop device, thereby setting the friction brake device and the rotation stop device respectively in the operating states; and conveying the carrier and the workpiece to a downstream-side operation step by the overhead conveyor.

In the above configuration, the friction brake device and the rotation stop device are in the operating states when no compressed air or electric power is supplied thereto, thereby eliminating the necessity of supplying compressed air or electric power at positions, in the conveyance path, other than the predetermined rotation position of the secondary carrier. Moreover, at the predetermined rotation position, the pipe or the wiring can be connected and disconnected by the automatic connection/disconnection device provided on the ground side, thereby enabling the supply source of the compressed air or the electric power to the friction brake device and the rotation stop device to be provided on the ground side, whereby the structure of the carrier to be loaded with the workpiece can be simplified.

Conventionally, when electric power is supplied from the ground side to a device on the carrier side, a current collector on the carrier side is brought into sliding contact with a bus bar provided on the ground side. This configuration has a problem that dust is caused by the sliding contact between the bus bar and the current collector. Meanwhile, according to the configuration of the present invention in which compressed air or electric power is supplied to the friction brake device and the rotation stop device through the pipe or the wiring connected by the automatic connection/disconnection device provided on the ground side, the above problem can be solved because the sliding contact is avoided.

The effect of the present invention is enhanced when the workpiece is a long object, in the overhead conveyor including the secondary carrier that supports the workpiece and is rotatable around the vertical axis with respect to the primary carrier. However, the present invention is not limited to the case where the workpiece is a long object. The present invention is effective if the workpiece has a large weight even though it is not a long object.

As described above, in the overhead conveyor and the workpiece conveying method using the overhead conveyor, according to the present invention, when the friction brake device is in the operating state, the friction member included in the main body provided in one of the primary carrier and the secondary carrier is in press-contact with the brake member provided in the other one of the primary carrier and the secondary carrier, thereby preventing rattling. When an operation is performed on an end portion of the workpiece which is a long object whose both ends in the longitudinal direction protrude from the hanger of the secondary carrier, at a certain position in the conveyance path, for example, force that causes a moment around the vertical axis may act on the workpiece due to the operation. Even in such a situation, the operability of the operation performed on the workpiece which is a long object is not deteriorated because rattling is prevented by the friction brake device.

DESCRIPTION OF THE PREFERRED EMBODIMENTS

Hereinafter an embodiment of the present invention will be described with reference to the drawings.

In the embodiment described below, front, rear, left, and right are defined relative to a carrier conveying direction (see an arrow B in FIG. 1, for example), and a view from the left side is a front view.

<Overhead Conveyor>

Figure 1:
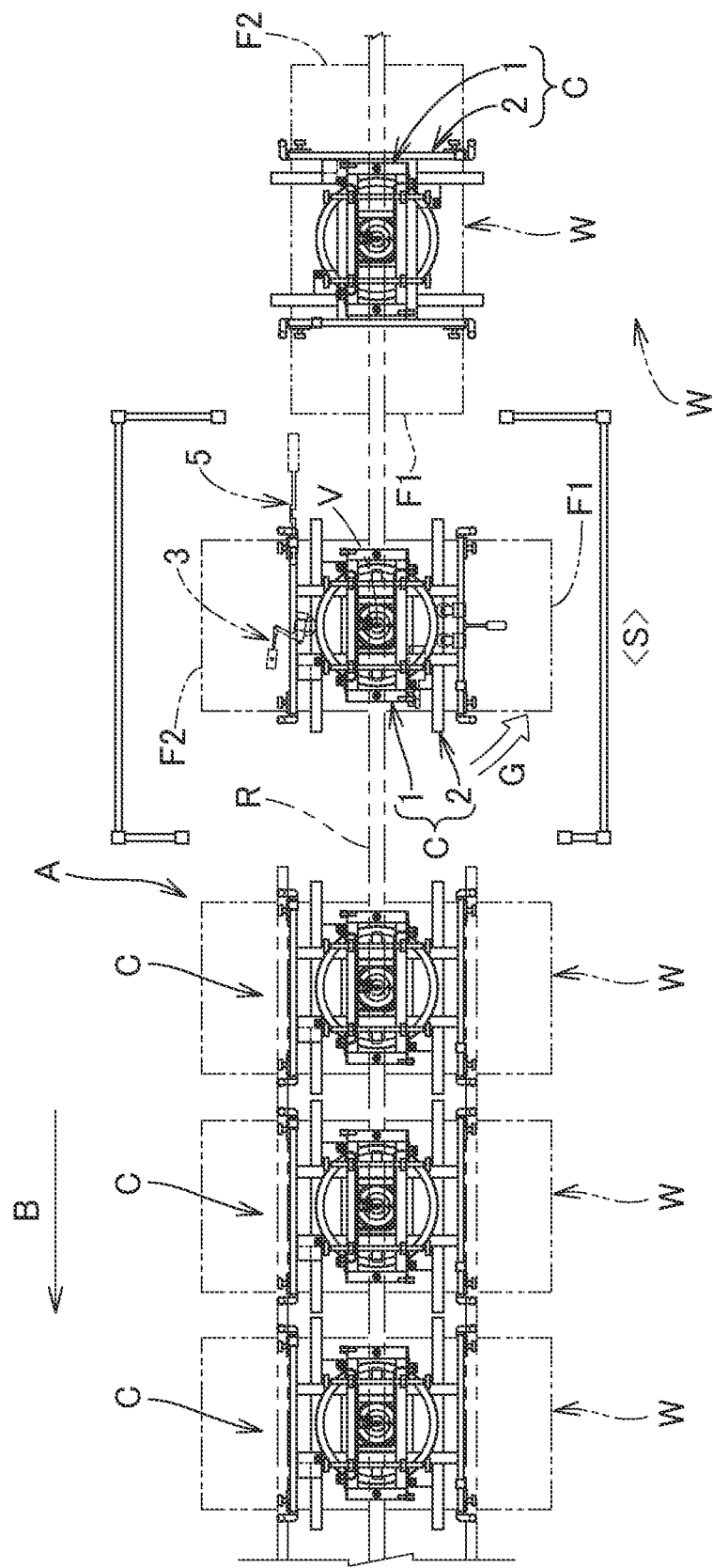
FIG. 1 is a schematic plan view showing a part of a conveyance path of an overhead conveyor according to an embodiment of the present invention.
Figure 2:
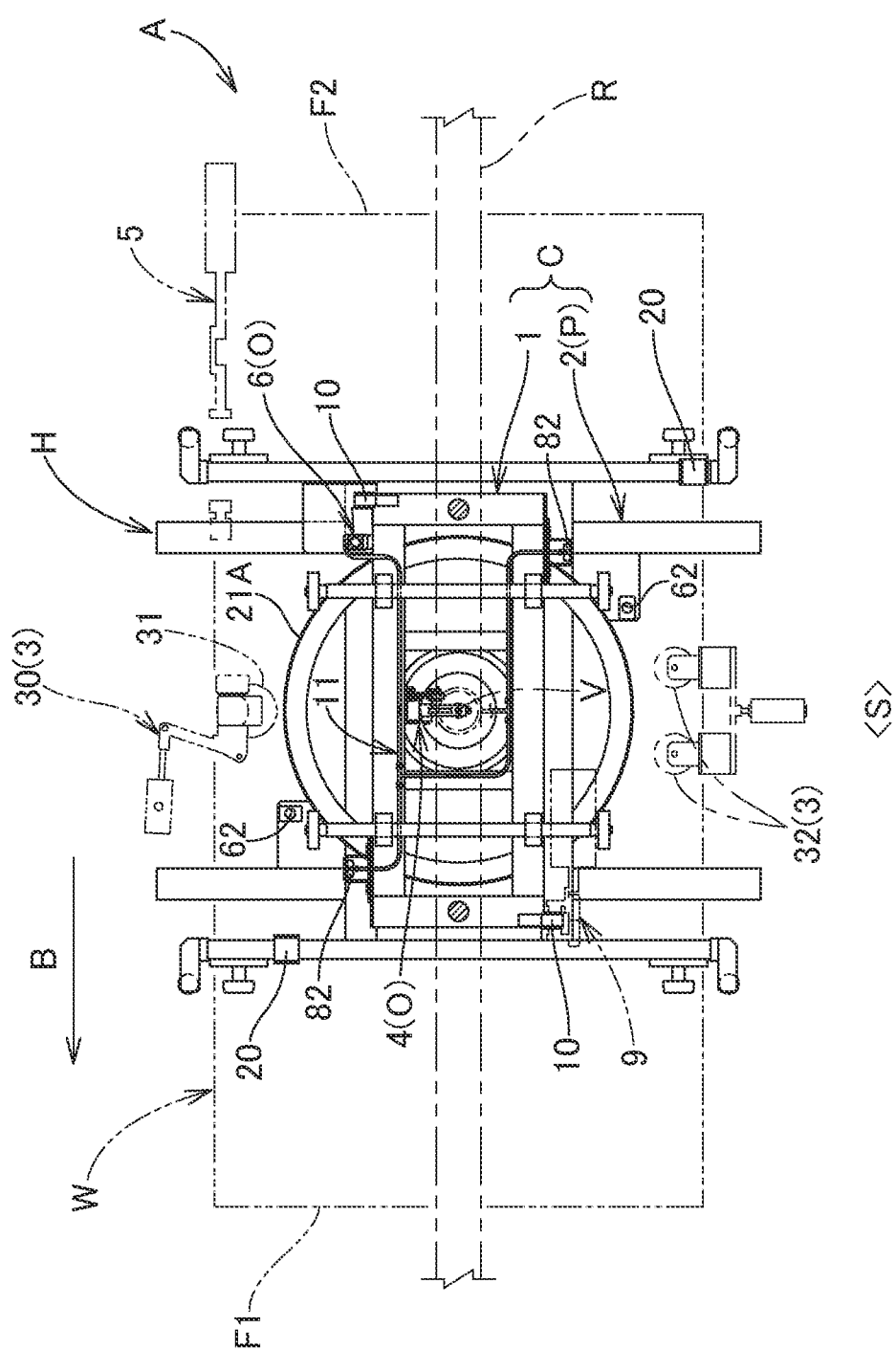
FIG. 2 is a major-part enlarged schematic plan view showing a predetermined rotation start position where a carrier is stopped at a stop/secondary carrier rotation position.
Figure 3:
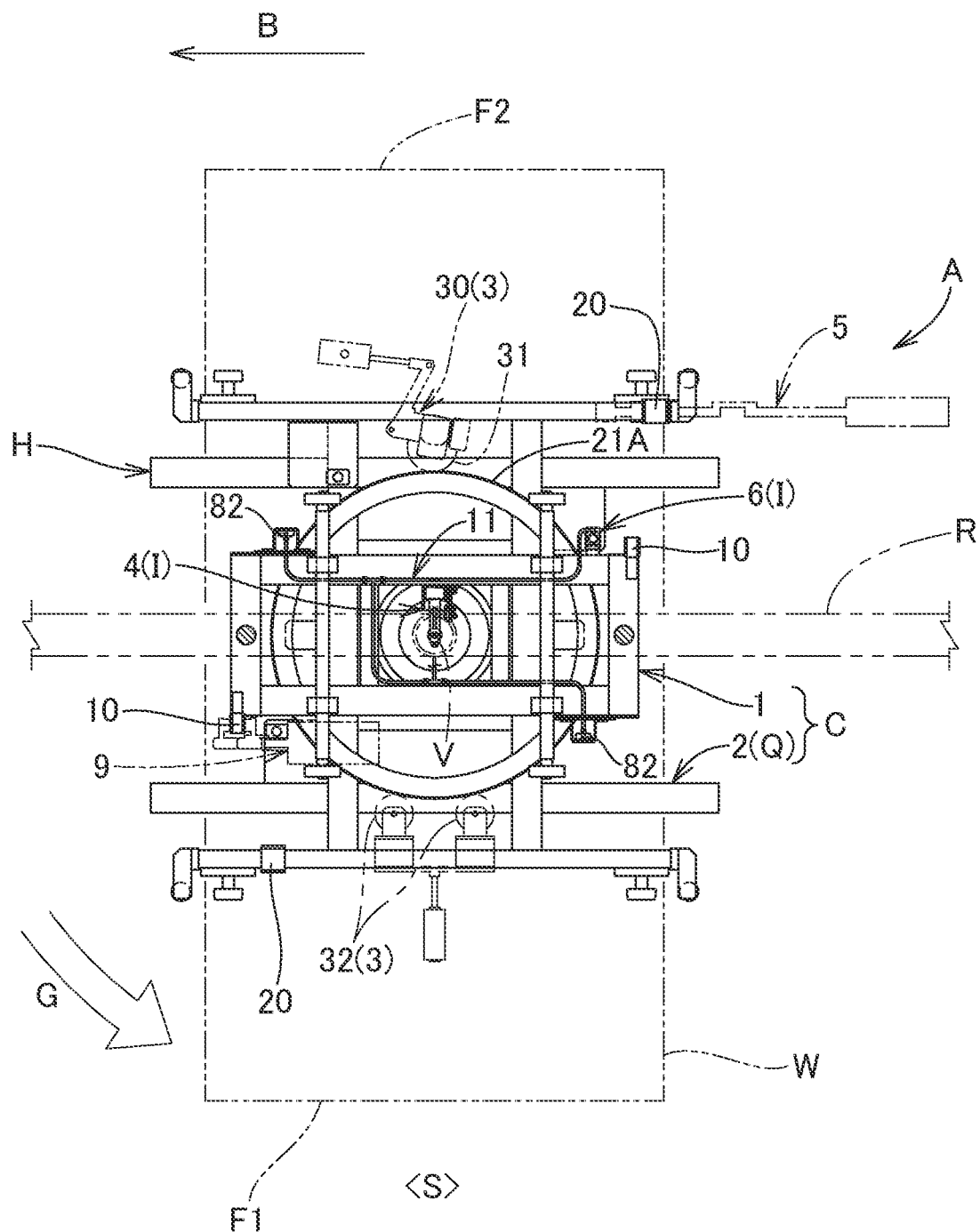
FIG. 3 is a major-part enlarged schematic plan view showing a predetermined rotation end position where a secondary carrier has been rotated by a predetermined angle.

As shown in the schematic plan view of FIG. 1 and the major-part enlarged schematic plan views of FIGS. 2 and 3, an overhead conveyor A according to the embodiment of the present invention conveys carriers C each loaded with a workpiece W, in a conveyance direction B along a running rail R laid along a conveyance path.

Each carrier C is composed of a primary carrier 1 and a secondary carrier 2. The primary carrier 1 and the secondary carrier 2 are connected to each other via a swing bearing 7 shown in a partial longitudinal cross-sectional schematic view of FIG. 5. An inner ring 71 is fixed to the primary carrier 1, an outer ring 72 is fixed to the secondary carrier, and a rolling element 70 rolls between the inner ring 71 and the outer ring 72. This enables the secondary carrier 2 to rotate around a vertical axis V with respect to the primary carrier 1. The secondary carrier 2 includes a hanger H that supports the workpiece W. The workpiece W is a long object having opposed ends F1, F2 in the longitudinal direction which protrude from the hanger H. The workpiece is about 2 to 10 m long, for example.

The overhead conveyor A has a function of stopping the carrier C at a stop/secondary carrier rotation position S, and rotating the secondary carrier 2 at a predetermined rotation angle around the vertical axis V, while the secondary carrier 2 is positioned by a positioning device 9. The secondary carrier 2 is rotated from a predetermined rotation start position P shown in the major-part enlarged schematic plan view of FIG. 2, by a rotation drive device 3, as shown in the major-part enlarged schematic plan view of FIG. 3, and is positioned at a predetermined rotation end position Q by a rotation positioning device 5 while a friction brake device 4 and a rotation stop device 6 are set in their non-operating states I. The overhead conveyor A of the present embodiment rotates the secondary carrier 2 by, for example, 90° counterclockwise in a plan view, as shown by an arrow G shown in FIG. 1 and FIG. 3, at the stop/secondary carrier rotation position S.

In the present embodiment, the overhead conveyor A has the function of rotating the secondary carrier 2 by a predetermined rotation angle around the vertical axis V. For example, the overhead conveyor A rotates the long workpiece W by 90° and conveys the same sideways as shown in FIG. 1 to cope with the factory layout.

Figure 4:
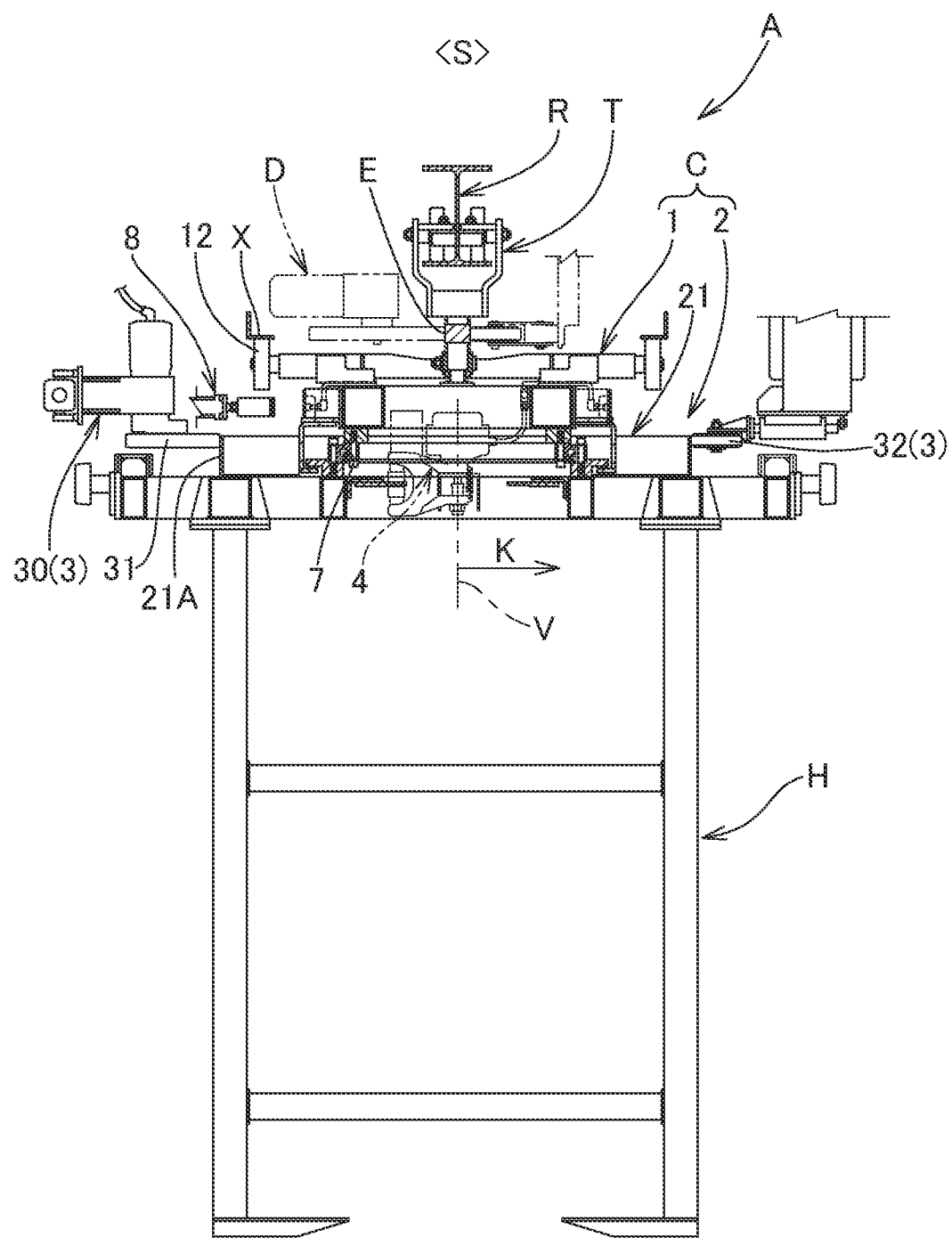
FIG. 4 is a partial longitudinal cross-sectional schematic view in which a carrier stopped at the stop/secondary carrier rotation position is viewed from the downstream side in a carrier conveying direction, and a workpiece is omitted.
Figure 5:
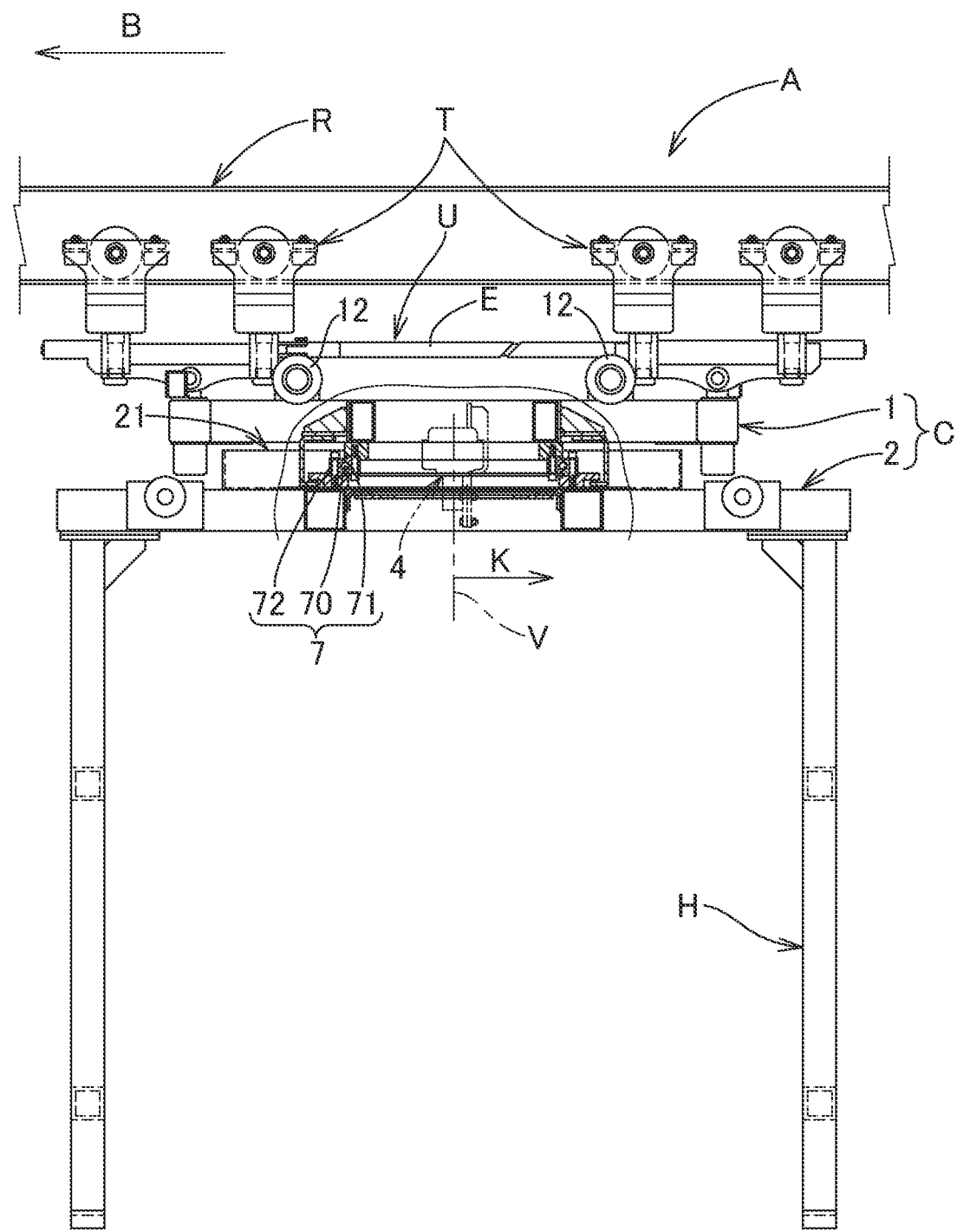
FIG. 5 is a partial longitudinal cross-sectional schematic front view of the carrier shown in FIG. 4.

As shown in the partial longitudinal cross-sectional schematic views of FIGS. 4 and 5, the carrier C is suspended from a trolley T engaged with the running rail R. For example, a running drive device D, which is a friction roller type drive device, drives the trolley T and a running drive surface E that is a side surface of a connection rod U, thereby moving the carrier C along the running rail R. The running drive device D may not necessarily be the friction roller type drive device, and may be a power chain type drive device or the like.

At the front and rear of the stop/secondary carrier rotation position S in the conveyance direction B, since front, rear, left, and right horizontal rollers 12 of the primary carrier 1 connected to the trolley T are guided by left and right guide rails X as shown in FIG. 4, swing of the carrier C is reduced.

<Rotation Drive Device>

As shown in the major-part enlarged schematic plan views of FIG. 2 and FIG. 3 and the partial longitudinal cross-sectional schematic view of FIG. 4, the overhead conveyor A is provided with the rotation drive device 3 that rotates the secondary carrier 2 around the vertical axis V. The rotation drive device 3 is composed of a friction roller type drive device 30 including a friction roller 31, and backup rollers 32, which are provided on the ground side. The secondary carrier 2 includes a drive body 21 having a cylindrical outer peripheral surface serving as a drive surface 21A.

Figure 6:
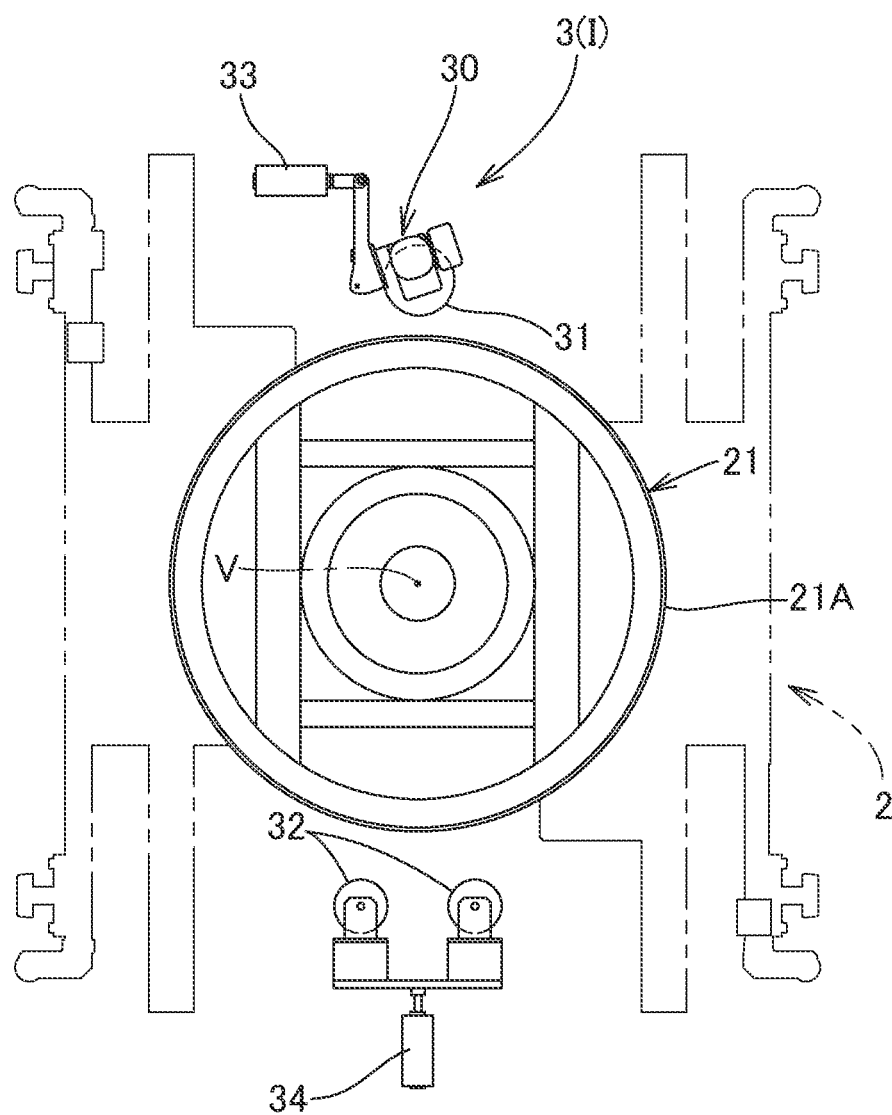
FIG. 6 is a schematic plan view showing an example of a rotation drive device in a non-operating state.
Figure 7:
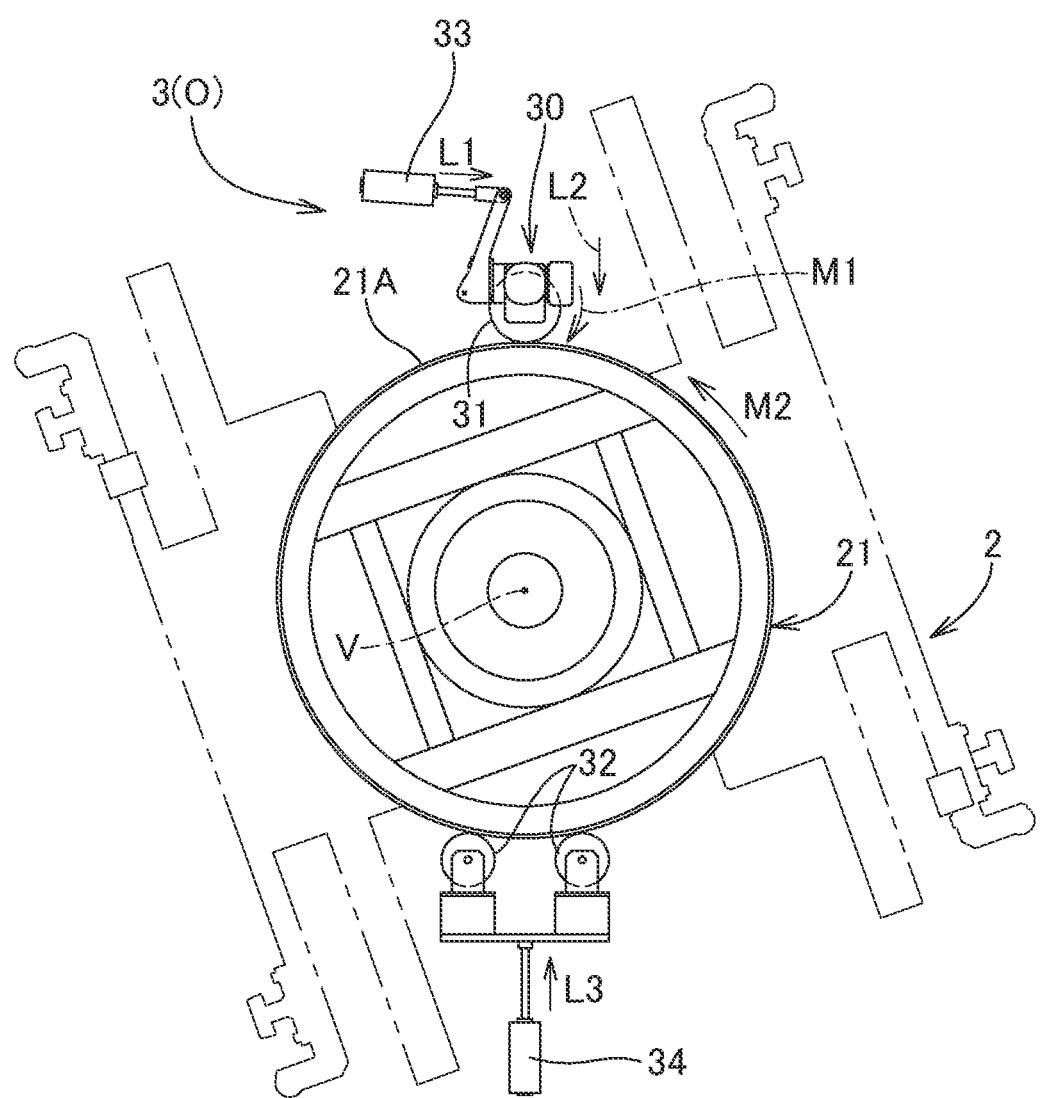
FIG. 7 is a schematic plan view showing an example of the rotation drive device in an operating state.

The schematic plan view of FIG. 6 shows the rotation drive device 3 in the non-operating state I, and the schematic plan view of FIG. 7 shows the rotation drive device 3 in the operating state O. When an air cylinder 33 is driven to extend a piston as shown by an arrow L1 in FIG. 7 from the position shown in FIG. 6, the friction roller 31 moves toward the drive surface 21A of the secondary carrier 2 as shown by an arrow L2, and the friction roller 31 is brought into press-contact with the drive surface 21A. When an air cylinder 34 is driven to extend a piston as shown by an arrow L3 in FIG. 7 from the position shown in FIG. 6, the backup rollers 32 move toward the drive surface 21A of the secondary carrier 2, and the backup rollers 32 are brought into press-contact with the drive surface 21A.

After the friction brake device 4 and the rotation stop device 6 are set in the non-operating states I, the friction roller 31 is rotated by, for example, a geared motor as shown by an arrow M1 in FIG. 7, whereby the secondary carrier 2 rotates around the vertical axis V as shown by an arrow M2.

When the air cylinder 33 is driven to retract the piston, the friction roller 31 retracts so as to move away from the drive surface 21A of the secondary carrier 2, and returns to the position shown in FIG. 6. Likewise, when the air cylinder 34 is driven to retract the piston, the backup rollers 32 retract so as to move away from the drive surface 21A of the secondary carrier 2, and return to the position shown in FIG. 6. The backup rollers 32 may not necessarily be moved toward and retracted from the drive surface 21A of the secondary carrier 2 by the air cylinder 34, and may be pressed against the drive surface 21A of the secondary carrier 2 by a spring, or may be fixed. The number of backup rollers 32 may be one, or three or more.

As described above, the rotation drive device 3 is composed of: the friction roller type drive device 30 including the friction roller 31 that can be moved toward and retracted from the drive surface 21A that is a cylindrical outer peripheral surface of the secondary carrier 2; and the backup rollers 32 that hold, with the friction roller 31, the drive body 21 of the secondary carrier 2.

In the above configuration, the secondary carrier 2 is rotated around the vertical axis V by the friction roller type drive device 30 while the cylindrical outer peripheral surface of the drive body 21 of the secondary carrier 2 is held between the friction roller 31 and the backup rollers 32 which are provided on the ground side. Therefore, the structure of the rotation drive device 3 is simplified, thereby improving the maintainability. Moreover, the secondary carrier 2 and the workpiece W can be stably rotated around the vertical axis V while maintaining their attitudes without being tilted.

<Primary Carrier Positioning Device>

At the stop/secondary carrier rotation position S shown in the major-part enlarged schematic plan views of FIG. 2 and FIG. 3, a positioning body 10 of the primary carrier 1 is positioned by the positioning device 9, whereby the carrier C is positioned. In the non-operating state I of the positioning device 9 shown in FIG. 8A, when a piston 91 is extended as shown by an arrow J in FIG. 8B by driving the air cylinder 90, the positioning device 9 enters the operating state O. That is, movement of the piston 91 causes an arm 92 to pivot, and engaging gears 93A, 93B pivot. Then, holding pieces 94, 95 are closed to hold the positioning body 10 of the primary carrier 1, whereby the carrier C is positioned in the conveyance direction B.

Figure 8A:
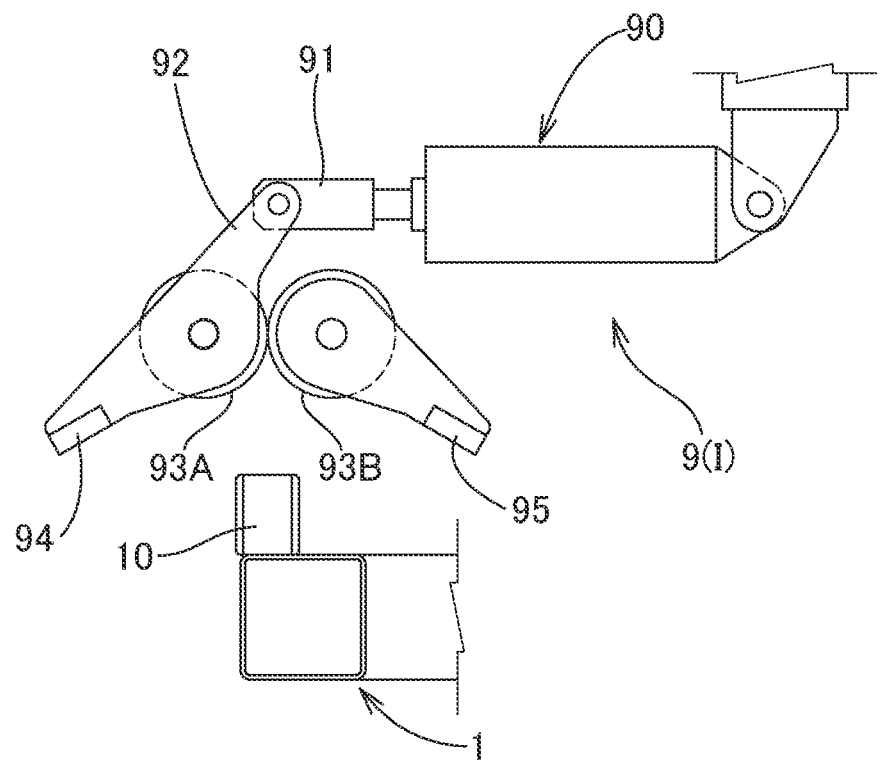
FIG. 8A is an explanatory view showing a positioning device in a non-operating state.

The friction brake device 4 and the rotation stop device 6 are set in their operating states O after the secondary carrier 2 has been rotated by a predetermined rotation angle, and the positioning device 9 is restored to the non-operating state I shown in FIG. 8A when the carrier C is conveyed toward the downstream side.

<Friction Brake Device>

Figure 9A:
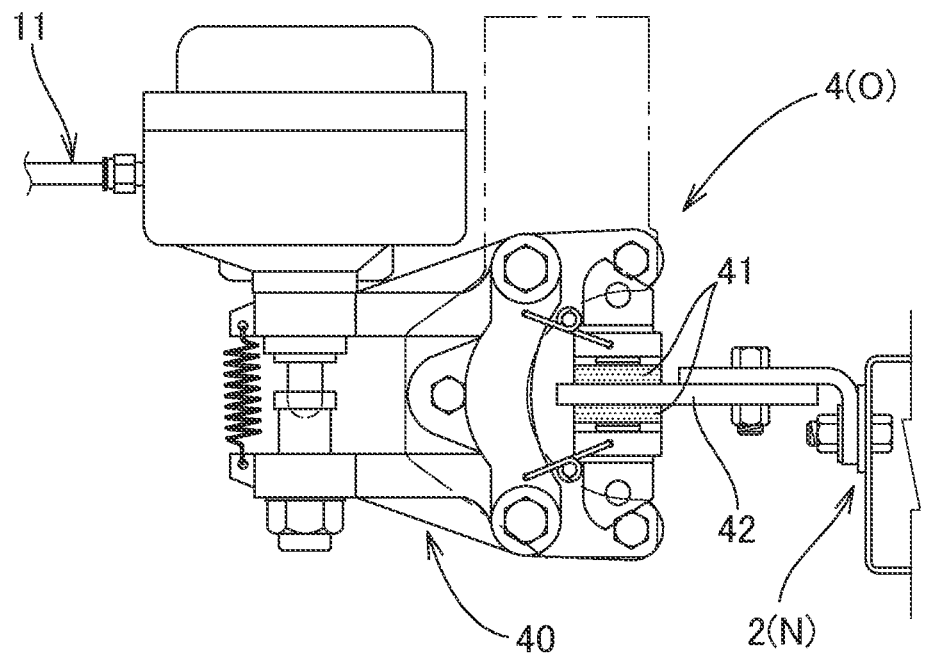
FIG. 9A is an explanatory view showing a friction brake device in an operating state.

When the friction brake device 4, which is shown in the major-part enlarged schematic plan views of FIG. 2 and FIG. 3 and the partial longitudinal cross-sectional schematic views of FIG. 4 and FIG. 5, is in the operating state O shown in the explanatory view of FIG. 9A, the friction brake device 4 holds a brake member 42 provided in the secondary carrier 2, with upper and lower friction members 41 included in a main body 40 provided in the primary carrier 1. In the state where the friction members 41 are in press-contact with the brake member 42, the secondary carrier 2 is in a non-rotatable state N with respect to the primary carrier 1.

Figure 9B:
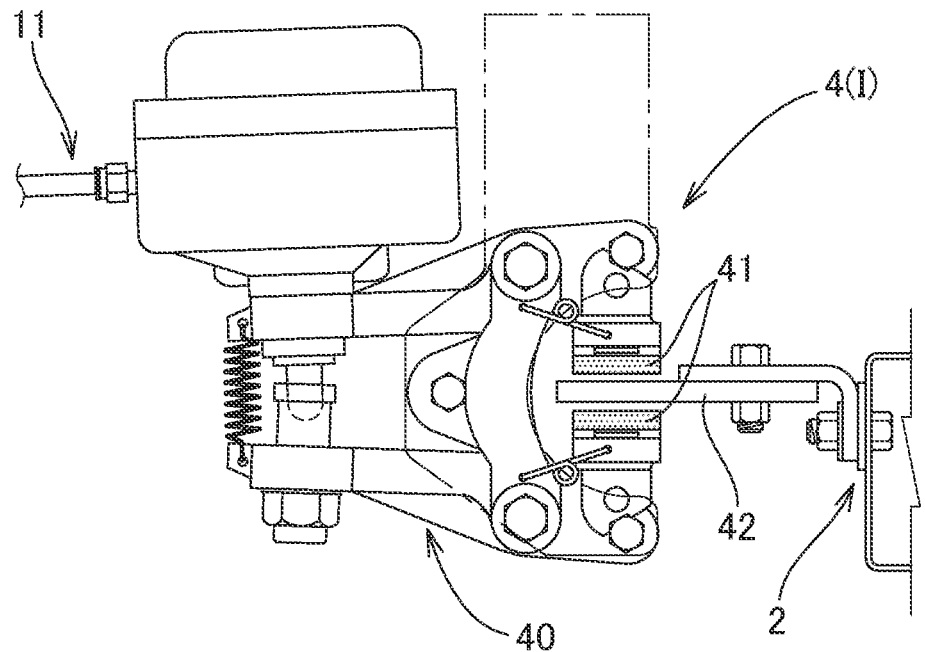
FIG. 9B is an explanatory view showing the friction brake device in a non-operating state.

With no compressed air being supplied from a pipe 11, the friction brake device 4 brings the friction members 41 into press-contact with the brake member 42 by using spring force, and is in an operating state O shown in FIG. 9A. With compressed air being supplied from the pipe 11, the friction brake device 4 is in a non-operating state I in which the friction members 41 are spaced away from the brake member 42 as shown in FIG. 9B.

The friction brake device 4 may be set in the operating state O by spring force, and may be set in the non-operating state I by electromagnetic force. In this case, electric power is supplied not from the pipe 11 but from wiring.

The friction brake device 4 having the above configuration brings the friction members 41 into press-contact with the brake member 42 when the friction brake device 4 is in the operating state O, thereby setting the secondary carrier 2 in the non-rotatable state N with respect to the primary carrier 1. Therefore, the mechanism of making the secondary carrier 2 non-rotatable with respect to the primary carrier 1 is simplified.

In particular, even when the rotation angle of the secondary carrier 2 needs to be flexibly changed, the friction brake device 4 of the present embodiment holds, with the friction members 41, any portion of the brake member 42 according to the rotation angle. Therefore, an effect that the rotation angle can be changed by a simple configuration is provided.

In the overhead conveyor A of the present embodiment, since accurate positioning for rotation of the secondary carrier 2 is realized by the rotation positioning device 5 on the ground side, the mechanism of the friction brake device 4 in the carrier C can be simplified. There are a plurality of carriers C in many cases. The greater the number of carriers C is, the more the simplification of the mechanism of the carriers C becomes effective.

The friction brake device 4 may have the main body 40 provided in the secondary carrier 2, and may bring the friction members 41 included in the main body 40 into press-contact with the brake member 42 provided in the primary carrier 1. Here, it is more preferable that the friction brake device 4 in the operating state O brings the friction members 41 included in the main body 40 provided in the primary carrier 1 into press-contact with the brake member 42 provided in the secondary carrier 2. The reason is as follows. That is, when the main body 40 of the friction brake device 4 is provided in the primary carrier 1 that does not rotate, routing of the pipe 11 or the wiring for supplying compressed air or electric power to the main body 40 is facilitated.

As shown in the partial longitudinal cross-sectional schematic view of FIG. 5, the friction brake device 4 is disposed inward in a radial direction K with respect to the inner ring 71 of the swing bearing 7. In this configuration, the diameter of the brake member 42 shown in FIG. 9A and FIG. 9B can be reduced while utilizing the space that is radially inward with respect to the inner ring 71 of the swing bearing 7. Therefore, reduction in weight and size of the whole friction brake device 4 can be achieved in a space-saving manner.

<Rotation Stop Device>

Figure 10A:
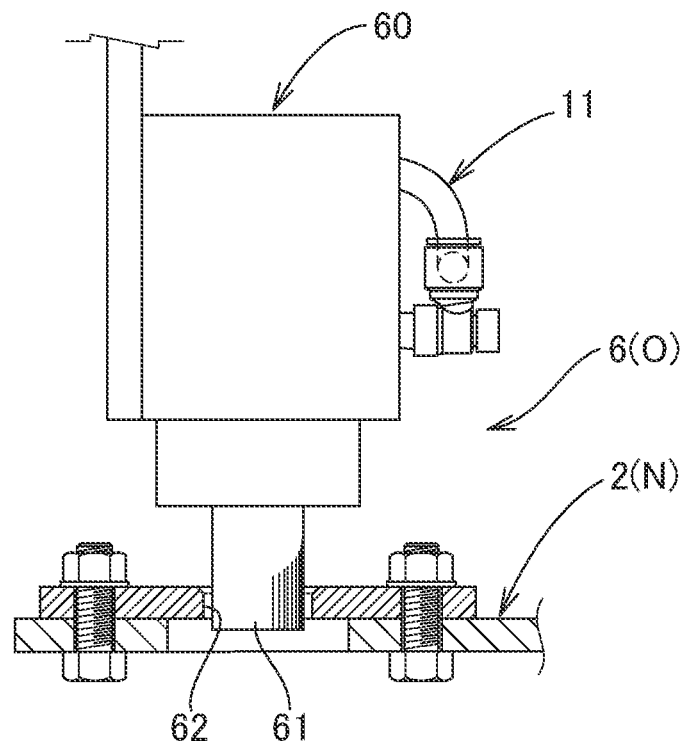
FIG. 10A is an explanatory view showing a rotation stop device in an operating state.

When the rotation stop device 6 shown in the major-part enlarged schematic plan views of FIG. 2 and FIG. 3 is in an operating state O as shown in FIG. 10A, a projection 61 of a main body 60 provided in the primary carrier 1 moves downward and enters a hole 62. In this state, the secondary carrier 2 is in a non-rotatable state N with respect to the primary carrier 1. The hole 62 may be a recess.

Figure 10B:
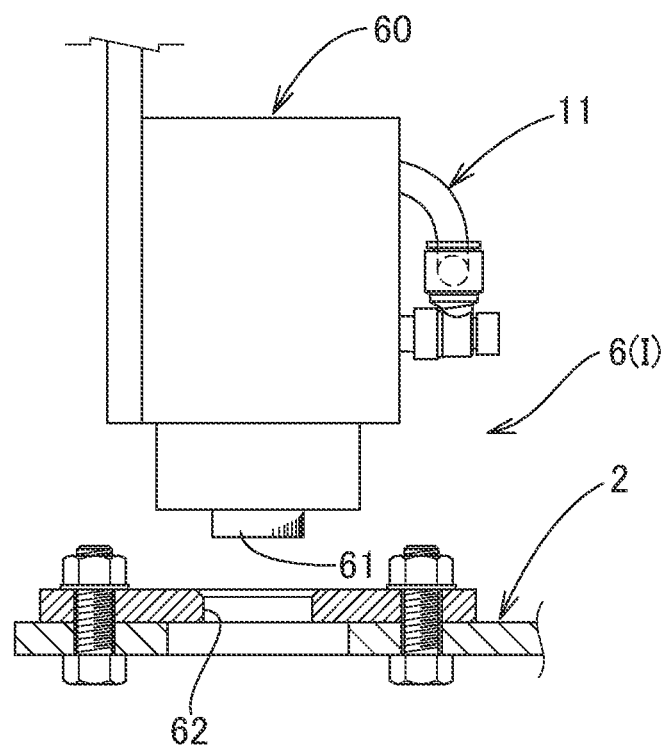
FIG. 10B is an explanatory view showing the rotation stop device in a non-operating state.

In the rotation stop device 6, a single-acting retracting type air cylinder is included in the main body 60, for example, and is in the operating state O shown in FIG. 10A when no compressed air is supplied from the pipe 11. When compressed air is supplied from the pipe 11, the rotation stop device 6 is in the non-operating state I in which the projection 61 moves upward and comes off from the hole 62 as shown in FIG. 10B.

The rotation stop device 6 may be set in the operating state O by spring force or the like, and may be set in the non-operating state I by electromagnetic force. In this case, electric power is supplied not from the pipe 11 but from wiring.

When the rotation stop device 6 is in the operating state O, the projection 61 enters the hole 62. Accordingly, the secondary carrier 2 can be stably and reliably set in the non-rotatable state N with respect to the primary carrier 1 by a simple mechanical structure. Therefore, even if the friction brake device 4 becomes inoperable due to a failure or the like, the secondary carrier 2 and the workpiece W are prevented from unexpectedly rotating due to external force or inertial force.

<Automatic Connection/Disconnection Device>

At the stop/secondary carrier rotation position S, when the secondary carrier 2 is rotated by the rotation drive device 3 as shown in the schematic plan view of FIG. 7 from the state shown in the schematic plan view of FIG. 6, the friction brake device 4 and the rotation stop device 6, which cause the secondary carrier 2 to be in the non-rotatable state N with respect to the primary carrier 1, need to be set in the non-operating states I before the friction roller 31 is rotated.

Figure 11:
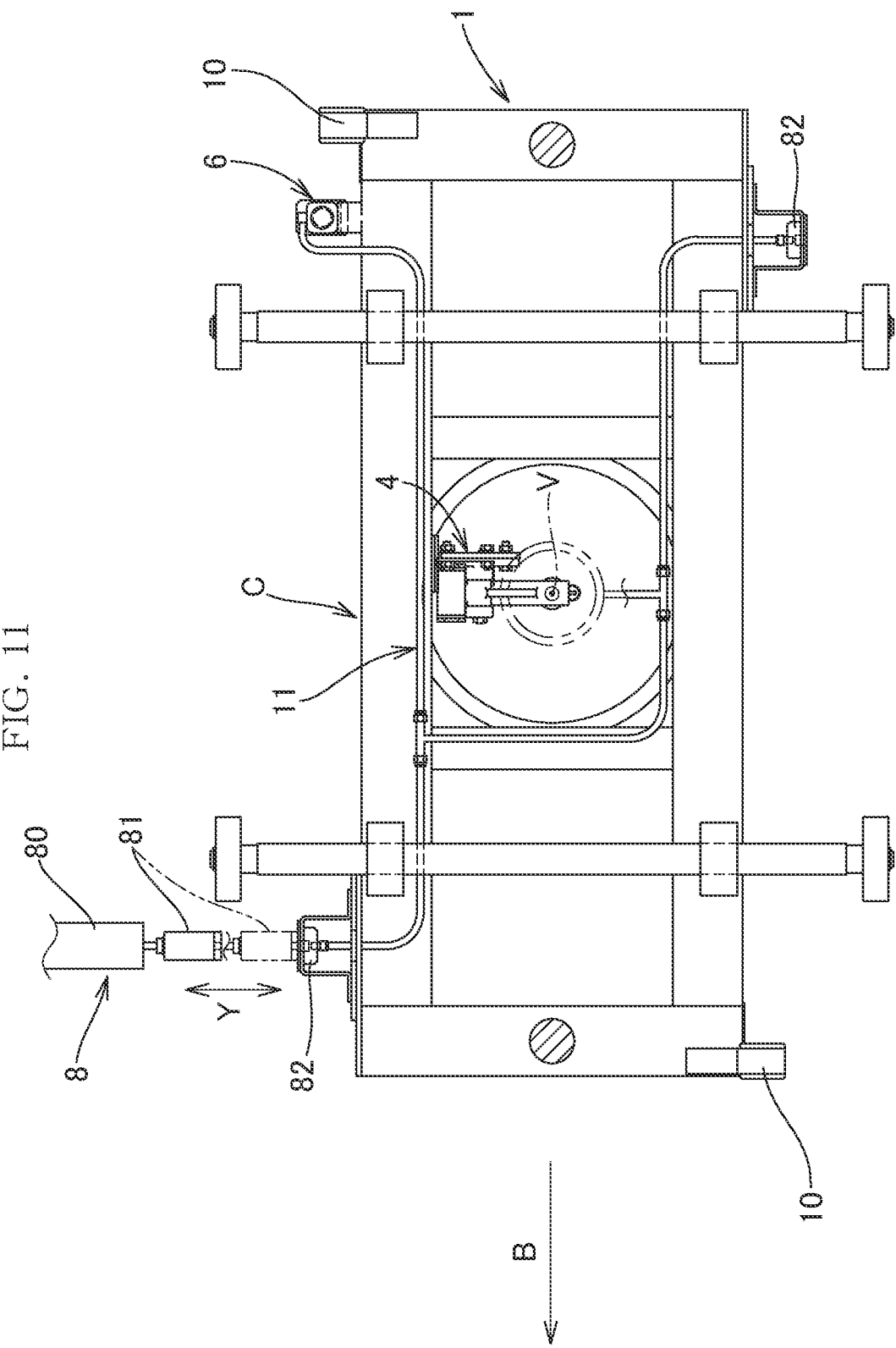
FIG. 11 is a schematic plan view showing an example of an automatic connection/disconnection device.

In order to set the friction brake device 4 and the rotation stop device 6 in the non-operating states I, compressed air is supplied to the pipe 11 of the primary carrier 1 by an automatic connection/disconnection device 8 provided on the ground side, as shown in the schematic plan view of FIG. 11.

That is, in the automatic connection/disconnection device 8, a main body 80 has an air cylinder, and the air cylinder can cause a connector 81 to move forward and retract as shown by an arrow Y. At the stop/secondary carrier rotation position S, when the connector 81 is moved forward at a predetermined timing, an end surface of the connector 81 comes into contact with a connection body 82. Thus, compressed air is supplied to the pipe 11 from a compressed-air supply source, on the ground side, connected to the main body 80. When the end surface of the connector 81 comes into contact with the connection body 82, the connection body 82 closely adheres to the end surface and seals the connection portion between them, thereby preventing dust or the like from entering the pipe 11.

In the case where the friction brake device 4 and the rotation stop device 6 are set in the non-operating state I by electromagnetic force, the friction brake device 4 and the rotation stop device 6 are connected to the connection body 82 through wiring, and wiring from a power supply source on the ground side is connected to the connector 81 of the automatic connection/disconnection device 8. In this case, if the connector 81 is moved forward at a predetermined timing, the end surface of the connector 81 comes into contact with the connection body 82. Thus, electric power is supped to the wiring connected to the friction brake device 4 and the rotation stop device 6, from the power supply source, on the ground side, connected to the main body 80.

<Rotation Positioning Device>

Figure 12A:
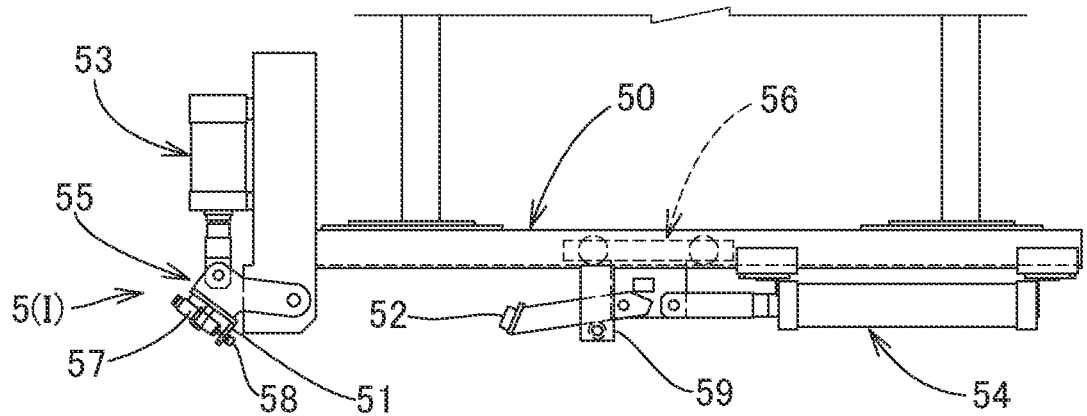
FIG. 12A is a front view illustrating an operation of a rotation positioning device, where a stopping member and a pressing member are at a stand-by position (non-operating state)

Next, the configuration and operation of the rotation positioning device 5 provided on the ground side in the overhead conveyor A will be described. Front views of FIG. 12A to FIG. 12E illustrate the operation of the rotation positioning device 5. FIG. 12A shows the rotation positioning device 5 in a non-operating state I, and FIG. 12E shows the rotation positioning device 5 in an operating state O.

As shown in FIG. 12A, the rotation positioning device 5 includes an air cylinder 53 in the up-down direction and an air cylinder 54 in the front-rear direction, which are fixed to a base body 50.

Figure 12B:
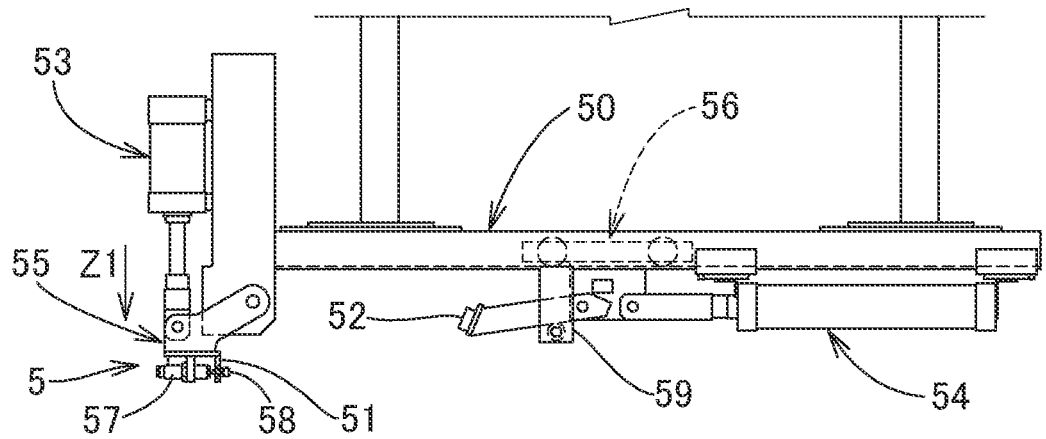
FIG. 12B is a front view illustrating an operation of the rotation positioning device, where the stopping member is moved downward and located at a stopping position.

A stopping member 51 supported by a guide member 55 is driven by the air cylinder 53, and pivots around a shaft in the left-right direction while moving upward and downward, thereby moving between a stand-by position shown in FIG. 12A and a stopping position shown in FIG. 12B. The rotation positioning device 5 is provided with a shock absorber. That is, a main body 57 of the shock absorber is disposed on the back side of the stopping member 51 (forward side in this embodiment), and a contact body 58 of the shock absorber protrudes from a surface, of the stopping member 51, which stops a rotation positioning body 20 shown in FIG. 12C to FIG. 12E (rearward in this embodiment).

A pressing member 52 supported by a guide member 56 and a support member 59 is driven by the air cylinder 54, and moves in the front-rear direction, thereby moving between the stand-by position shown in FIG. 12A and a pressing position shown in FIG. 12E. The pressing member 52, having been extruded by the air cylinder 54 as shown by an arrow Z3 in FIG. 12D, is disconnected from the support member 59, moves downward, and faces the stopping member 51.

In the case where the secondary carrier 2 is rotated by the rotation drive device 3 from the predetermined rotation start position P shown in FIG. 2 and is positioned at the predetermined rotation end position Q shown in FIG. 3 by the rotation positioning device 5, the friction roller 31 of the rotation drive device 3 shown in FIG. 6 is brought into press-contact with the drive surface 21A of the secondary carrier 2, and the backup rollers 32 are brought into press-contact with the drive surface 21A. For example, in accordance with the operation timings of the rollers, the stopping member 51 is moved downward as shown by an arrow Z1 in FIG. 12B and located at a predetermined stopping position.

Next, the connector 81 of the automatic connection/disconnection device 8 shown in FIG. 11 is moved forward and brought into contact with the connection body 82, and compressed air is supplied to the pipe 11 to set the friction brake device 4 and the rotation stop device 6 in the non-operating states I.

Next, as shown in FIG. 7, the secondary carrier 2 is rotated by the rotation drive device 3. In the primary carrier 1, a proximity sensor for rotation end position is disposed at a position corresponding to the predetermined rotation end position Q of the secondary carrier 2, and a proximity sensor for deceleration is disposed at a predetermined position in front of the predetermined rotation end position Q. Until a striker of the secondary carrier 2 gets close to the proximity sensor for deceleration and thereby the proximity sensor for deceleration is turned on, the rotation drive device 3 rotates the secondary carrier 2 at a normal speed. After the proximity sensor for deceleration has been turned on, the rotation drive device 3 rotates the secondary carrier 2 at a low speed. The rotation drive device 3 is stopped at the position where the striker of the secondary carrier 2 gets close to the proximity sensor for rotation end position and thereby the proximity sensor for rotation end position is turned on, whereby rotation of the secondary carrier 2 is ended.

Figure 12C:
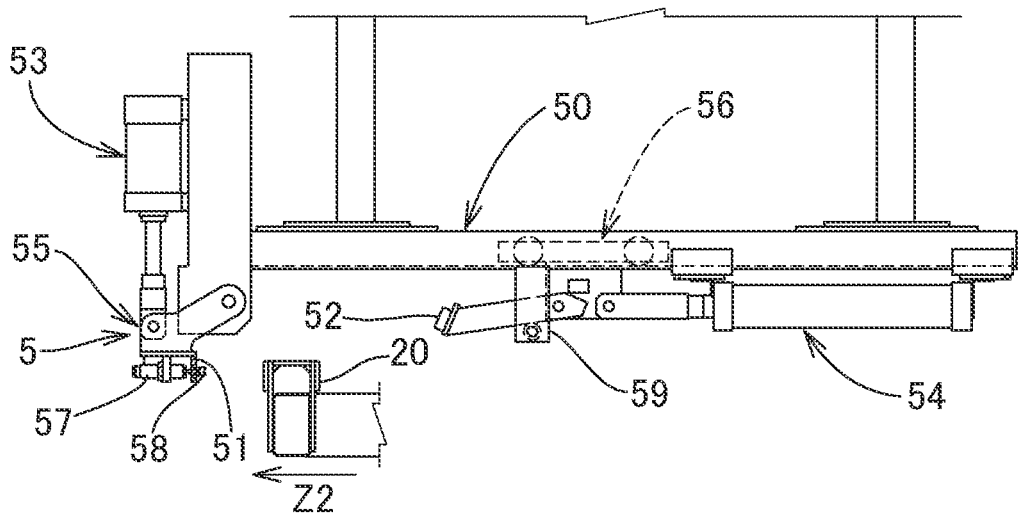
FIG. 12C is a front view illustrating an operation of the rotation positioning device, where the secondary carrier rotates and a rotation positioning body approaches the stopping member.
Figure 12D:
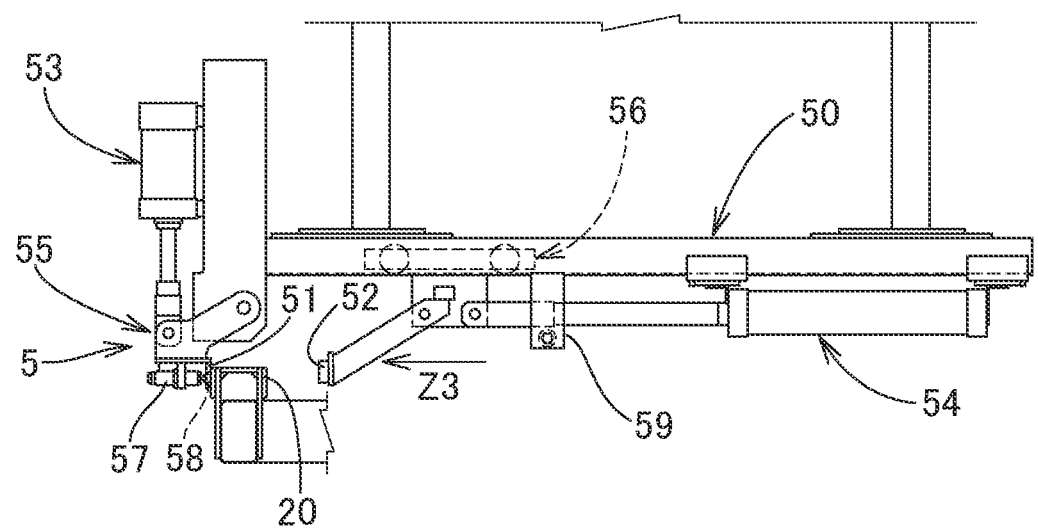
FIG. 12D is a front view illustrating an operation of the rotation positioning device, where the rotation positioning body is stopped by the stopping member.
Figure 12E:
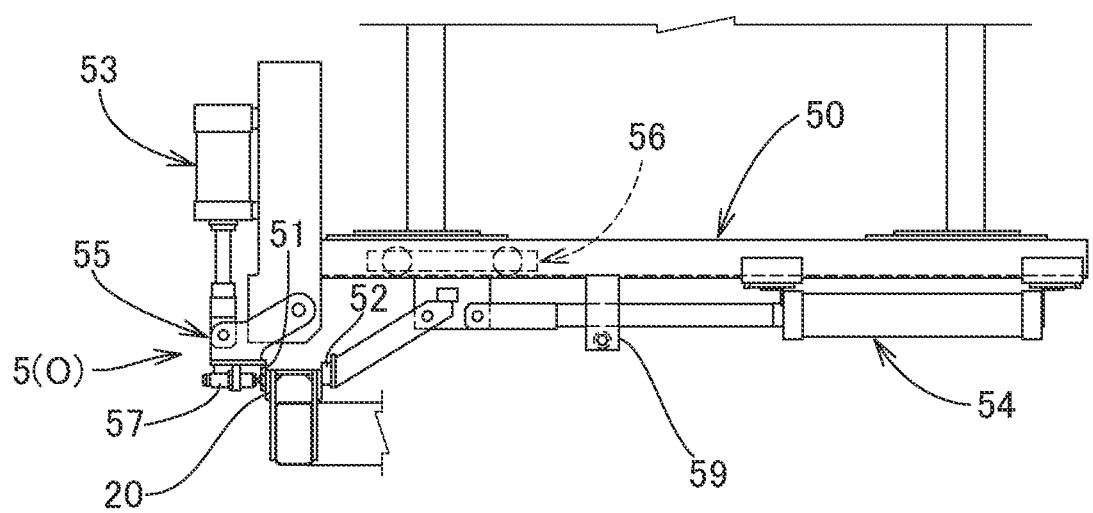
FIG. 12E is a front view illustrating an operation of the rotation positioning device, where the pressing member is moved downward while being moved forward, and is located at a pressing position at which the pressing member and the stopping member hold therebetween the rotation positioning body (operating state).

The rotation positioning body 20 of the secondary carrier 2 approaches the stopping member 51 at a low speed as shown by an arrow Z2 in FIG. 12C. At the rotation end position of the secondary carrier 2, the rotation positioning body 20 pushes the contact body 58 of the shock absorber 57 and thereafter is stopped by the stopping member 51 as shown in FIG. 12D. The pressing member 52 is moved forward as shown by the arrow Z3 in FIG. 12D. As shown in FIG. 12E, the pressing member 52 presses the rotation positioning body 20 so as to hold the rotation positioning body 20 between itself and the stopping member 51. In this operating state O of the rotation positioning device 5, the secondary carrier 2 is positioned at the predetermined rotation end position Q shown in FIG. 3.

In the configuration of the rotation positioning device 5 described above, the stopping member 51 stops the rotation positioning body 20 provided in the secondary carrier 2, and the pressing member 52 presses the rotation positioning body 20 toward the stopping member 51 so as to hold the rotation positioning body 20 between itself and the stopping member 51. Therefore, even if the moments of inertia, around the vertical axis V, of the secondary carrier 2 and the workpiece W which is a long object whose both ends F1, F2 in the longitudinal direction protrude from the hanger H of the secondary carrier 2, are great, the secondary carrier 2 can be accurately positioned at a position obtained by rotating the secondary carrier 2 by a predetermined rotation angle around the vertical axis V with respect to the primary carrier 1.

The rotation positioning device 5 may not necessarily be provided with the stopping member 51 and the pressing member 52. For example, the rotation positioning device 5 may be configured so that, after rotation of the secondary carrier 2 has ended, the front and rear holding pieces included in the rotation positioning device 5 on the ground side hold the rotation positioning body 20 and perform positioning of the secondary carrier 2.

<Operation after Positioning of Secondary Carrier by Rotation Positioning Device>

With the secondary carrier 2 being positioned at the predetermined rotation end position Q, the connector 81 of the automatic connection/disconnection device 8 shown in FIG. 11 is retracted to shut off supply of the compressed air to the pipe 11, thereby setting the friction brake device 4 and the rotation stop device 6 respectively in the operating states O. Since the friction brake device 4 is in the operating state O, the state where the secondary carrier 2 is positioned with respect to the primary carrier 1 is maintained.

Next, the air cylinders 33, 34 shown in FIG. 7 are driven to move the friction roller 31 and the backup rollers 32 of the rotation drive device 3 away from the drive surface 21A as shown in FIG. 6, thereby setting the rotation drive device 3 in the non-operating state I shown in FIG. 6. Moreover, the air cylinders 53, 54 shown in FIG. 12E are driven to return the stopping member 51 and the pressing member 52 of the rotation positioning device 5 to the stand-by position shown in FIG. 12A, thereby setting the rotation positioning device 5 in the non-operating state I shown in FIG. 12A.

Figure 8B:
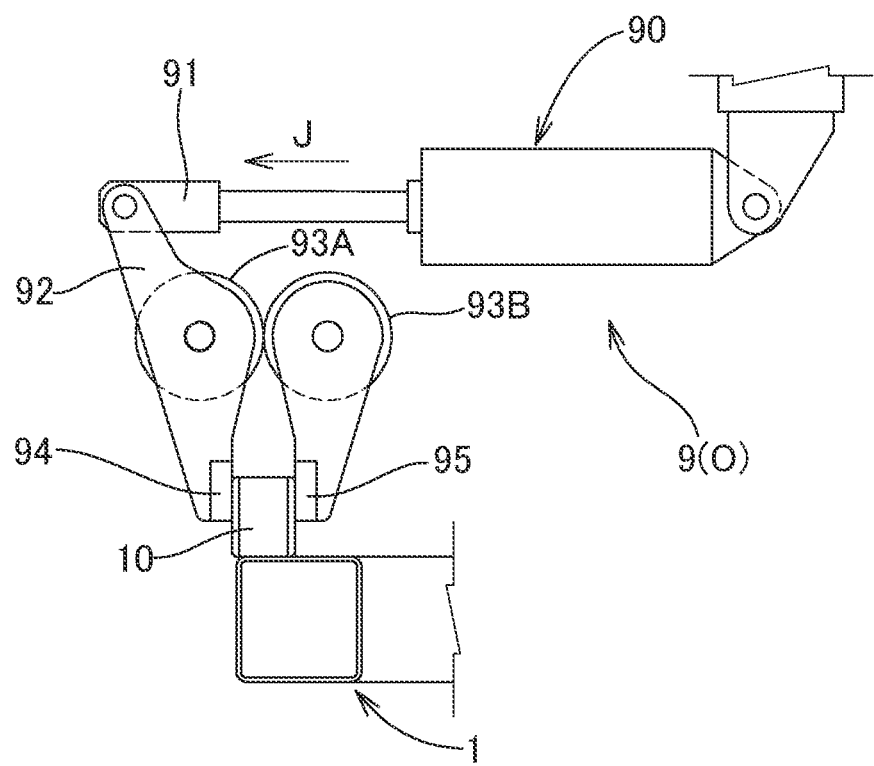
FIG. 8B is an explanatory view showing the positioning device in an operating state.

Next, the air cylinder 90 shown in FIG. 8B is driven so that the holding pieces 94, 95 of the positioning device 9 are opened and separated from the positioning body 10 as shown in FIG. 8A, thereby setting the positioning device 9 in the non-operating state I shown in FIG. 8A.

If the rotation drive device 3, the rotation positioning device 5, and the positioning device 9 are in the respective non-operating states I, they do not interfere with the carrier C. Therefore, the carrier C can be conveyed to the downstream side.

According to the configuration of the overhead conveyor A as described above, at the predetermined rotation start position P of the secondary carrier, in which the carrier C has been stopped at a predetermined position in the conveyance path, the friction brake device 4 and the rotation stop device 6 are set in the non-operating states I, and the secondary carrier 2 is rotated by a predetermined angle around the vertical axis V by the rotation drive device 3. Then, the secondary carrier 2 is positioned at the predetermined rotation end position Q by the rotation positioning device 5, and thereafter, the friction brake device 4 and the rotation stop device 6 are set in the operating states O. When the friction brake device 4 is in the operating state O, the friction members 41 of the main body 40 provided in one of the primary carrier 1 and the secondary carrier 2 are in press-contact with the brake member 42 provided in the other one of the primary carrier 1 and the secondary carrier 2, thereby preventing rattling. In particular, when an operation is performed on an end portion of the workpiece W that is a long object whose both ends F1, F2 in the longitudinal direction protrude from the hanger H of the secondary carrier 2, at a certain position in the conveyance path, force that causes a moment around the vertical axis V may act on the workpiece W due to the operation. Even in such a case, the operability of the operation performed on the workpiece W that is a long object is not deteriorated because rattling is prevented by the friction brake device 4.

<Workpiece Conveying Method Using Overhead Conveyor>

In a method of conveying the workpiece W by using the overhead conveyor A according to the embodiment of the present invention, the friction brake device 4 and the rotation stop device 6 are in their operating states O when no compressed air or electric power is supplied thereto. The conveying method includes the following steps.

(1) A step of, at the predetermined rotation start position P of the secondary carrier 2 in the conveyance path, supplying compressed air or electric power to the friction brake device 4 and the rotation stop device 6 through the pipe or the wiring connected by the automatic connection/disconnection device 8 provided on the ground side, thereby setting the friction brake device 4 and the rotation stop device 6 in their non-operating states I.

(2) A step of rotating the secondary carrier 2 by the rotation drive device 3.

(3) A step of positioning the secondary carrier 2 at the predetermined rotation end position Q by the rotation positioning device 5.

(4) A step of disconnecting the pipe or the wiring by the automatic connection/disconnection device 8 to stop supply of the compressed air or the electric power to the friction brake device 4 and the rotation stop device 6, thereby setting the friction brake device 4 and the rotation stop device 6 in the operating states O.

(5) A step of conveying the carrier C and the workpiece W to a downstream-side operation step by the overhead conveyor A.

In the above configuration, since the friction brake device 4 and the rotation stop device 6 are in their operating states O when no compressed air or electric power is supplied thereto, it becomes unnecessary to supply compressed air or electric power at positions, in the conveyance path, other than the stop/secondary carrier rotation position S. Moreover, since, at the stop/secondary carrier rotation position S, the pipe or the wiring can be connected and disconnected by the automatic connection/disconnection device 8 provided on the ground side, the supply source of the compressed air or the electric power to the friction brake device 4 and the rotation stop device 6 can be provided on the ground side, whereby the structure of the carrier C loaded with the workpiece W can be simplified.

Conventionally, when electric power is supplied from the ground side to a device on the carrier C side, a current collector on the carrier side is brought into sliding contact with a bus bar provided on the ground side. This configuration has a problem that dust is caused by the sliding contact between the bus bar and the current collector. Meanwhile, according to the configuration of the present invention in which compressed air or electric power is supplied to the friction brake device 4 and the rotation stop device 6 through the pipe or the wiring connected by the automatic connection/disconnection device 8 provided on the ground side, the sliding contact is avoided. Therefore, the above problem can be solved.

The description of the above embodiment is in all aspects illustrative and not restrictive. Various improvements and modifications can be made without departing from the scope of the present invention.

What is claimed is:

1. An overhead conveyor for conveying a carrier loaded with a workpiece, the carrier being suspended by a trolley that is engaged with a running rail laid along a conveyance path, the carrier including a primary carrier connected to the trolley, and a secondary carrier having a hanger that supports the workpiece, the secondary carrier being rotatable around a vertical axis with respect to the primary carrier, the overhead conveyor comprising:

a rotation drive device that rotates the secondary carrier around the vertical axis;

a friction brake device that sets the secondary carrier in a non-rotatable state with respect to the primary carrier; and a rotation positioning device that is disposed on a ground side and positions the secondary carrier at a predetermined rotation end position obtained by rotating the secondary carrier by a predetermined rotation angle around the vertical axis, wherein the friction brake device, in an operating state thereof, brings a friction member included in a main body provided in one of the primary carrier and the secondary carrier, into press-contact with a brake member provided in the other one of the primary carrier and the secondary carrier.

2. The overhead conveyor according to claim 1, wherein the secondary carrier includes a drive body having, as a drive surface, a cylindrical outer peripheral surface, and the rotation drive device includes, on the ground side:
a friction roller type drive device that includes a friction roller capable of moving toward and retracting from the drive surface of the secondary carrier; and
a backup roller that holds, with the friction roller, the drive body of the secondary carrier.

3. The overhead conveyor according to claim 1, wherein the rotation positioning device includes: a stopping member that stops a rotation positioning body provided in the secondary carrier; and a pressing member that presses the rotation positioning body toward the stopping member so as to hold, with the stopping member, the rotation positioning body.

4. The overhead conveyor according to claim 1, further comprising, in addition to the friction brake device, a rotation stop device that sets the secondary carrier in a non-rotatable state with respect to the primary carrier, wherein
the rotation stop device in an operating state causes a projection of a main body provided in one of the primary carrier and the secondary carrier, to move into a recess or a hole provided in the other one of the primary carrier and the secondary carrier.

5. The overhead conveyor according to claim 1, wherein the friction brake device is disposed inward, in a radial direction, with respect to an inner ring of a swing bearing that supports the secondary carrier rotatably around the vertical axis with respect to the primary carrier.

6. The overhead conveyor according to claim 1, wherein the friction brake device, in the operating state, brings the friction member included in the main body provided in the primary carrier, into press-contact with the brake member provided in the secondary carrier.

7. A workpiece conveying method using the overhead conveyor according to claim 1,
the friction brake device being in the operating state when no compressed air or electric power is supplied thereto, the method comprising:
at a predetermined rotation start position of the secondary carrier in the conveyance path, supplying compressed air or electric power to the friction brake device through a pipe or wiring connected by an automatic connection/disconnection device provided on the ground side, thereby setting the friction brake device in a non-operating state;
rotating the secondary carrier by the rotation drive device;
positioning the secondary carrier at the predetermined rotation end position by the rotation positioning device;
disconnecting the pipe or the wiring by the automatic connection/disconnection device to stop supply of the compressed air or the electric power to the friction brake device, thereby setting the friction brake device in the operating state; and
conveying the carrier and the workpiece to a downstream-side operation step by the overhead conveyor.

8. A workpiece conveying method using the overhead conveyor according to claim 4,
the friction brake device and the rotation stop device being respectively in operating states when no compressed air or electric power is supplied thereto, the method comprising:
at a predetermined rotation start position of the secondary carrier in the conveyance path, supplying compressed air or electric power to the friction brake device and the rotation stop device through a pipe or wiring connected by an automatic connection/disconnection device provided on the ground side, thereby setting the friction brake device and the rotation stop device respectively in non-operating states;
rotating the secondary carrier by the rotation drive device;
positioning the secondary carrier at the predetermined rotation end position by the rotation positioning device;
disconnecting the pipe or the wiring by the automatic connection/disconnection device to stop supply of the compressed air or the electric power to the friction brake device and the rotation stop device, thereby setting the friction brake device and the rotation stop device respectively in the operating states; and
conveying the carrier and the workpiece to a downstream-side operation step by the overhead conveyor.

* * * * *